(12) United States Patent
Miyahara

(10) Patent No.: US 9,659,356 B2
(45) Date of Patent: May 23, 2017

(54) IMAGE BLUR CORRECTION APPARATUS AND IMAGE BLUR CORRECTION METHOD

(71) Applicant: CANON KABUSHIKI KAISHA, Tokyo (JP)

(72) Inventor: Shimpei Miyahara, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 92 days.

(21) Appl. No.: 14/699,565

(22) Filed: Apr. 29, 2015

(65) Prior Publication Data

US 2015/0317775 A1    Nov. 5, 2015

(30) Foreign Application Priority Data

May 1, 2014   (JP) ................. 2014-094872

(51) Int. Cl.
*G06K 9/40* (2006.01)
*G06T 5/50* (2006.01)
*G06T 5/00* (2006.01)

(52) U.S. Cl.
CPC ............... *G06T 5/50* (2013.01); *G06T 5/003* (2013.01); *G06T 2207/10004* (2013.01); *G06T 2207/10016* (2013.01); *G06T 2207/20182* (2013.01)

(58) Field of Classification Search
CPC . G06T 5/50; G06T 5/003; G06T 2207/20182; G06T 2207/10016; G06T 2207/10004

USPC .................................................. 382/255, 263
See application file for complete search history.

(56) References Cited

U.S. PATENT DOCUMENTS

2010/0123787 A1* 5/2010 Yamanaka ........... G02B 27/646
                                                          348/208.4
2014/0285677 A1* 9/2014 Fujita ................. H04N 5/23258
                                                          348/208.6

FOREIGN PATENT DOCUMENTS

JP       2007-114466 A     5/2007

* cited by examiner

*Primary Examiner* — Andrew Moyer
(74) *Attorney, Agent, or Firm* — Cowan, Liebowitz & Latman, P.C.

(57) ABSTRACT

An image blur correction apparatus, comprises a blur correction amount calculation unit configured to calculate a blur correction amount based on a shake amount of the apparatus; an estimation calculation unit configured to calculate an estimated value of the blur correction amount using a blur correction amount calculated up until a previous time; a correction unit configured to correct an image blur by cutting out an image using the blur correction amount or the estimated value; and a determination unit configured to determine whether or not to calculate the estimated value in accordance with a frame rate of a moving image.

9 Claims, 5 Drawing Sheets

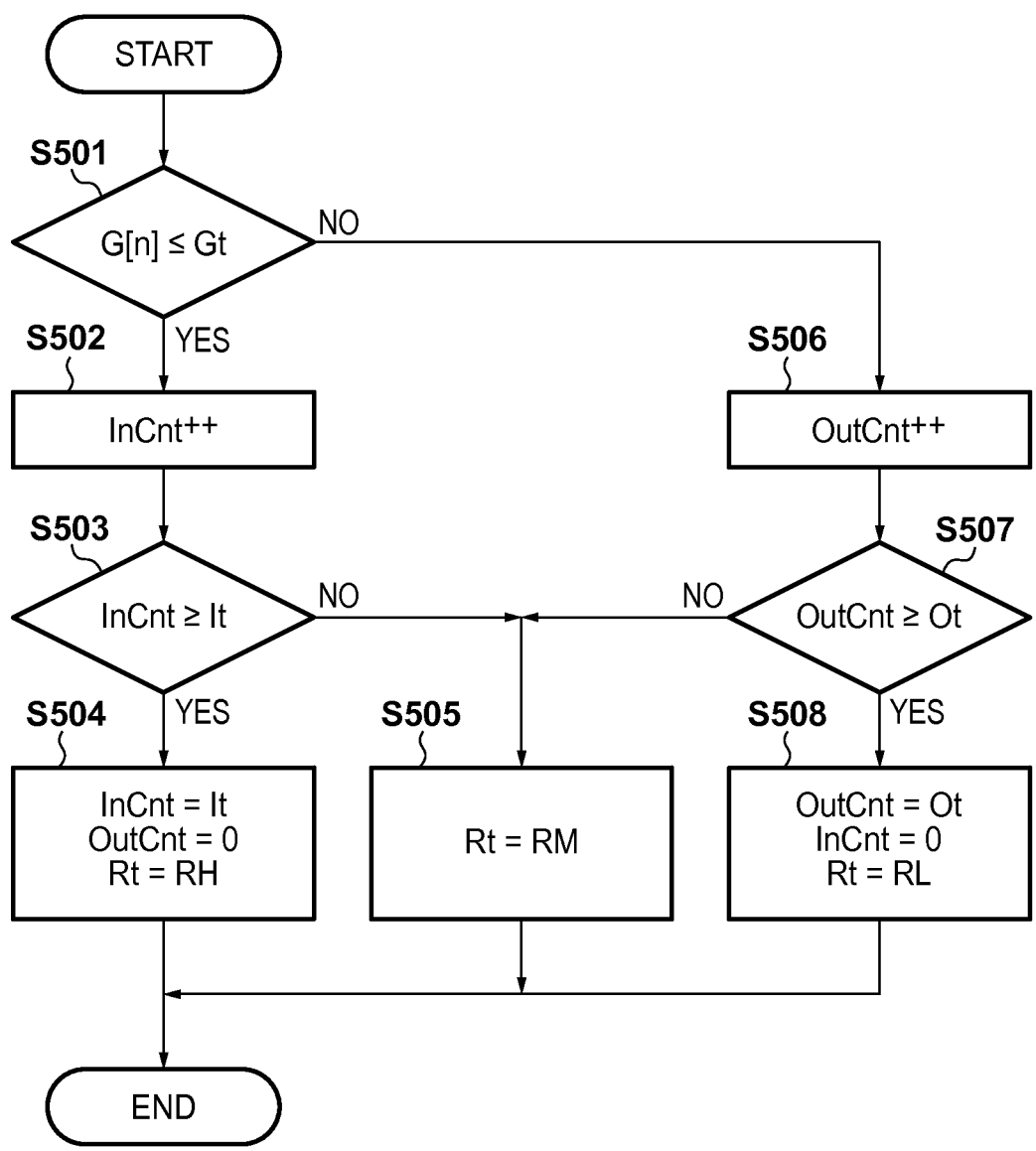
F I G. 5

IMAGE BLUR CORRECTION APPARATUS AND IMAGE BLUR CORRECTION METHOD

BACKGROUND OF THE INVENTION

Field of the Invention

The present invention relates to a technique to correct an image blur caused by a camera shake of an apparatus.

Description of the Related Art

Camera shake compensation functions of an image capturing apparatus include an optical camera shake compensation function and an electronic camera shake compensation function; the former detects a camera shake (angular vibration) and shift vibration of the apparatus and moves a corrective optical system so as to offset the detected camera shake and shift vibration, whereas the latter cuts out an image in each frame of moving images in a direction for cancelling an image blur caused by the camera shake.

In the electronic camera shake compensation, it is important to synchronize each frame of moving images with a timing for acquiring a camera shake signal. As the synchronization cannot always be established, it is also important to prepare a handling method for a case in which the synchronization cannot be established, e.g., when the acquisition of the camera shake signal is delayed.

In Japanese Patent Laid-Open No. 2007-114466, camera shake compensation is performed using predicted camera shake signals in a case where the differences between the predicted camera shake signals and the actual camera shake information indicate repetition of sign inversion within a fixed time period, and camera shake compensation is performed using a fixed correction amount in a case where the differences are equal to or larger than a fixed value within the fixed time period. That is to say, in Japanese Patent Laid-Open No. 2007-114466, the predicted signals are not used and images are centered using the fixed correction amount in a case where the magnitude of camera shake signals is large due to, for example, unidirectional panning, and camera shake compensation is performed using the predicted signals only in other cases.

Incidentally, according to Japanese Patent Laid-Open No. 2007-114466 described above, a CPU that is involved in the calculation for predicting the camera shake signals at the time of capturing moving images is subjected to a large calculation processing load.

SUMMARY OF THE INVENTION

The present invention has been made in consideration of the aforementioned problems, and realizes a technique to reduce a calculation processing load associated with prediction of a camera shake signal in electronic camera shake compensation performed at the time of capturing moving images.

In order to solve the aforementioned problems, the present invention provides an image blur correction apparatus, comprising: a blur correction amount calculation unit configured to calculate a blur correction amount based on a shake amount of the apparatus; an estimation calculation unit configured to calculate an estimated value of the blur correction amount using a blur correction amount calculated up until a previous time; a correction unit configured to correct an image blur by cutting out an image using the blur correction amount or the estimated value; and a determination unit configured to determine whether or not to calculate the estimated value in accordance with a frame rate of a moving image.

In order to solve the aforementioned problems, the present invention provides an image stabilization method for a shake of an apparatus, the method comprising the steps of: calculating a blur correction amount based on a shake amount of the apparatus; calculating an estimated value of the blur correction amount using a blur correction amount calculated up until a previous time; correcting an image blur by cutting out an image using the blur correction amount or the estimated value; and determining whether or not to calculate the estimated value in accordance with a frame rate of a moving image.

According to the present invention, it is possible to reduce a calculation processing load associated with prediction of a camera shake signal in electronic camera shake compensation performed at the time of capturing moving images.

Further features of the present invention will become apparent from the following description of exemplary embodiments (with reference to the attached drawings).

BRIEF DESCRIPTION OF THE DRAWINGS

FIG. 5 is a flowchart showing camera shake correction amount determination processing according to the present embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments.

First Embodiment

The following describes an embodiment in which an image blur correction apparatus of the present invention is exemplarily applied to an image capturing apparatus, such as a digital video camera, that captures moving images and still images.

It should be noted that, while the present invention is exemplarily applied to an image capturing apparatus in the embodiment described below, the present invention is not limited in this way and can be applied, for example, to a camera-equipped mobile telephone, smartphone, and tablet, and to other image capturing devices with a camera shake compensation function using an electronic image blur correction.

<Apparatus Configuration>

Figure 1:
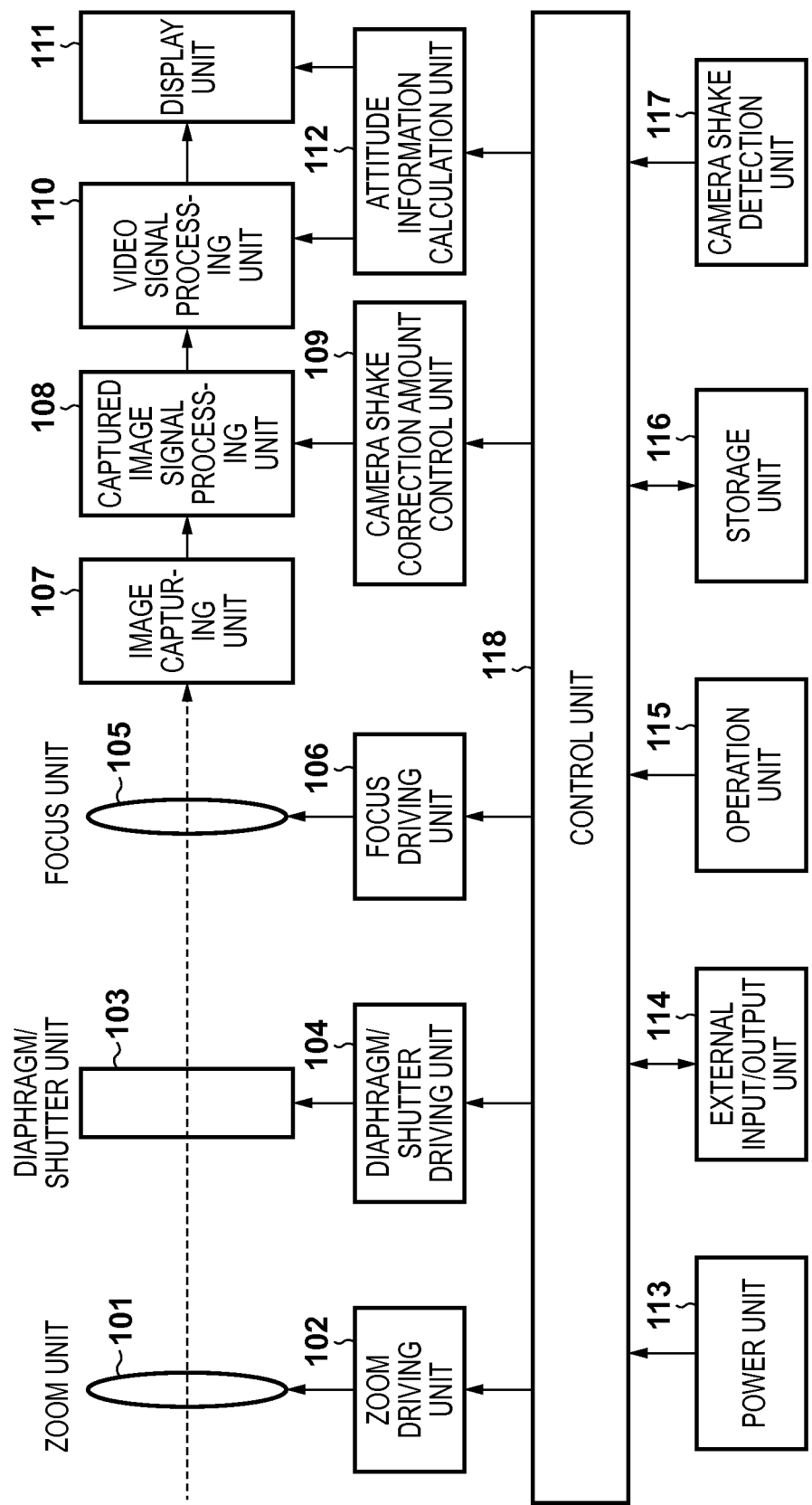
FIG. 1 is a block diagram of an image capturing apparatus according to the present embodiment.

With reference to FIG. 1, a description is now given of an outline of a configuration and functions of an image capturing apparatus according to an embodiment of the present invention.

In FIG. 1, a zoom unit 101 includes a zoom lens for changing magnification. A zoom driving unit 102 drives the zoom unit 101 in accordance with a control command. A diaphragm/shutter unit 103 includes a shutter with a diaphragm function for adjusting an incident light amount of an optical image of a subject. A diaphragm/shutter driving unit 104 drives the diaphragm/shutter unit 103 in accordance with a control command. A focus unit 105 includes a focus lens for adjusting focus. A focus driving unit 106 drives the focus unit 105 in accordance with a control command.

An image capturing unit 107 includes an image sensor composed of, for example, a CCD or CMOS sensor for converting the optical image of the subject that has passed through various types of lenses described above into an electrical signal, and also includes an A/D converter for converting an analog image signal output from the image sensor into a digital signal.

A captured image signal processing unit 108 generates a video signal by applying predetermined signal processing, such as filter processing, color conversion processing, and gamma processing, to a captured image signal output from the image capturing unit 107.

A camera shake correction amount control unit 109 calculates a camera shake correction amount through shake correction amount calculation processing, which will be described later, and outputs the calculated camera shake correction amount to the captured image signal processing unit 108. The captured image signal processing unit 108 also executes camera shake compensation processing for cutting out an image in each frame of moving images in a direction for cancelling an image blur caused by a camera shake, using a camera shake correction amount or an estimated value of a camera shake correction amount calculated by the camera shake correction amount control unit 109.

A video signal processing unit 110 processes the video signal output from the captured image signal processing unit 108 in accordance with the purpose of use; for example, it generates video files and video data to be displayed by compressing and encoding the output video signal.

A display unit 111 is a display device, such as a liquid crystal panel and an organic EL panel, for displaying the video data output from the video signal processing unit 110 and screen information.

An attitude information calculation unit 112 calculates attitude information used in determination of an attitude of the apparatus, and outputs the calculated attitude information to the video signal processing unit 110.

A power unit 113 is composed of a primary battery, a secondary battery, an AC adapter, and the like, and supplies a necessary electric power to the components of the apparatus.

An external input/output unit 114, which is a communication interface for external communication, performs wired or wireless communication with an external device, such as a server, and transmits and receives control signals and video signals.

An operation unit 115 includes switches, cursor keys, a touchscreen, and the like for issuing instructions related to, for example, on/off of the power, start/stop of recording of video, capturing of still images, zoom operations, switching between operation modes, and a menu screen.

A storage unit 116 is a memory card, a hard disk drive, and the like attached to the apparatus, or a flash memory and a hard disk drive built in the apparatus. The storage unit 116 stores video files and various types of information related to camera control.

A camera shake detection unit 117 is, for example, a gyroscope that detects a movement of the apparatus, and calculates a camera shake amount of the apparatus at the time of image capture.

A control unit 118 includes a CPU and a memory that stores control programs executed by the CPU, and controls the operations of the entire image capturing apparatus.

<Description of Operation Modes>

Below is a general description of the operations of the image capturing apparatus configured in the above-described manner.

The operation unit 115 includes an anti-vibration switch that enables selection of an anti-vibration (camera shake compensation) mode. Upon selection of the anti-vibration mode with the anti-vibration switch, the control unit 118 issues an instruction for starting anti-vibration processing to the camera shake correction amount control unit 109, and in response, the camera shake correction amount control unit 109 executes the anti-vibration processing until it receives an instruction for stopping the anti-vibration processing. The operation unit 115 also includes an image capture mode selection switch that enables selection of one of a still image capture mode and a moving image capture mode, and the operation conditions of various driving units can be changed in each of the image capture modes.

The operation unit 115 also includes a shutter release button that turns on a first switch (SW1) and a second switch (SW2), in this order, in accordance with a pressing amount. The shutter release button is configured to turn on a first switch signal SW1 when the shutter release button is pressed halfway down, and turn on a second switch signal SW2 when the shutter release button is pressed all the way down. Once the first switch signal SW1 has been turned on, the focus driving unit 106 drives the focus unit 105 to adjust focus, and the diaphragm/shutter driving unit 104 drives the diaphragm/shutter unit 103 to make an adjustment to achieve an appropriate amount of exposure. Once the second switch signal SW2 has been turned on, the image capturing unit 107 captures images, and video data to which the signal processing has been applied is stored into the storage unit 116.

The operation unit 115 also includes a moving image recording switch; in the moving image capture mode, capturing of moving images is started when the switch is pressed, and recording is stopped when the switch is pressed again while capturing the moving images.

The operation unit 115 also includes a reproduction mode selection switch that enables selection of a reproduction mode in which the above-described anti-vibration processing is suspended.

The operation unit 115 also includes a zoom switch for issuing a zoom instruction. Upon reception of an instruction for changing a zoom magnification ratio from the zoom switch, the zoom driving unit 102 drives and moves the zoom unit 101 to a designated zoom position in accordance with a control command from the control unit 118. At the same time, predetermined calculation processing is executed using video data which has been captured by the image capturing unit 107 and to which the signal processing has been applied, the focus driving unit 106 drives the focus unit 105 to adjust focus in accordance with a control command from the control unit 118 based on the acquired calculation result, and the diaphragm/shutter driving unit 104 drives the diaphragm/shutter unit 103 to make an adjustment to achieve an appropriate amount of exposure.

<Configuration of Camera Shake Correction Amount Control Unit>

Figure 2:
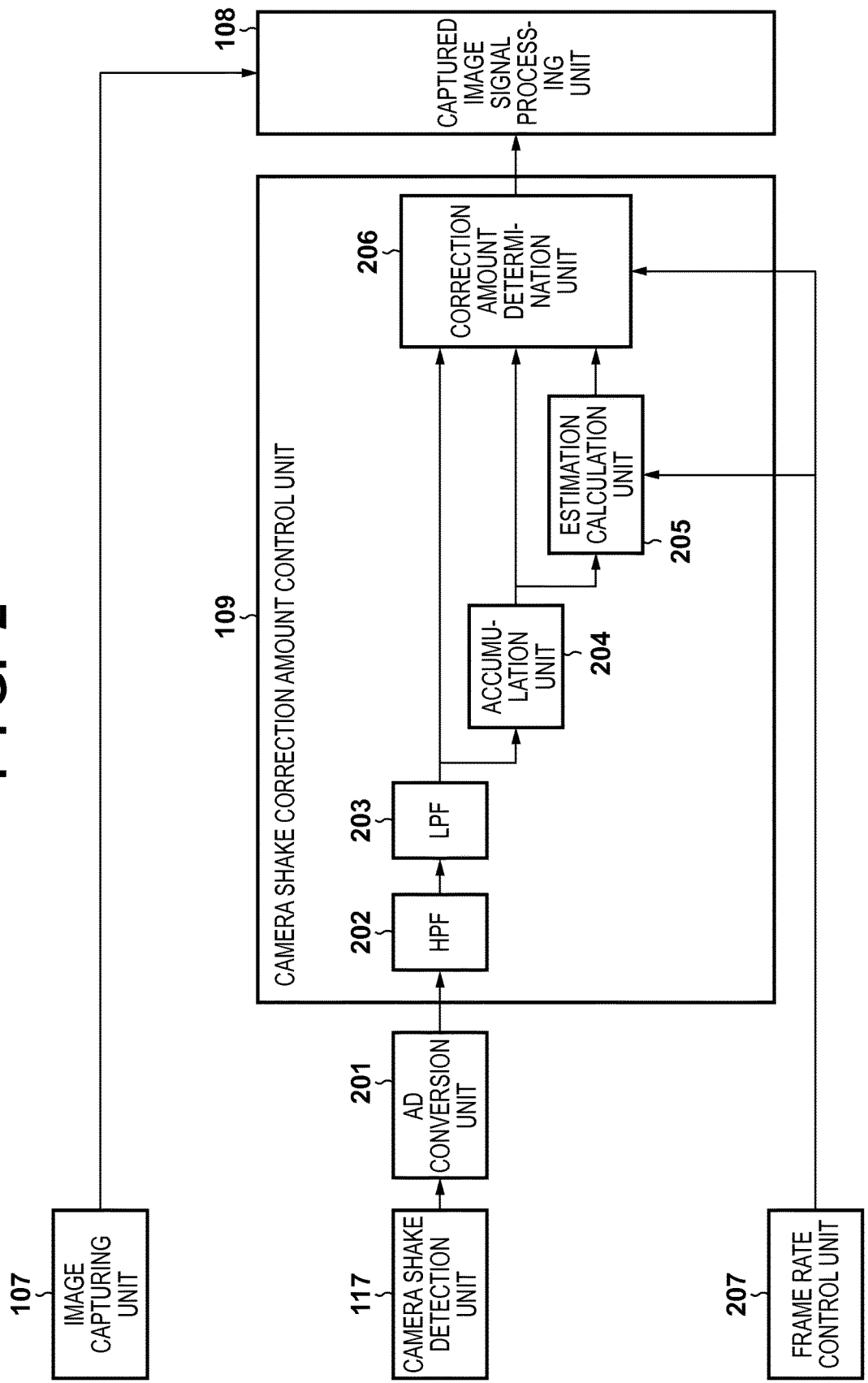
FIG. 2 is a block diagram of a camera shake correction amount control unit according to the present embodiment.

With reference to FIG. 2, the following describes a detailed configuration of the camera shake correction amount control unit shown in FIG. 1. It should be noted that, as the configuration of the camera shake correction amount control unit applies to any movement of the apparatus (a pitching direction, a yawing direction, and a rolling direction), the following description focuses only on one movement.

The camera shake detection unit 117 detects angular velocity data mainly using the gyroscope, and outputs the detected angular velocity data as a voltage. An AD conversion unit 201 converts the data output from the gyroscope into digital data. A high-pass filter (HPF) 202 removes offset components and temperature drift components of the gyroscope. A low-pass filter (LPF) 203 converts the angular velocity data into angle data by integrating the angular velocity data as-is, thereby calculating a shake amount. An accumulation unit 204 accumulates calculated shake amounts. An estimation calculation unit 205 performs calculation for estimating a current shake amount using a shake amount that was calculated up until the previous time. A correction amount determination unit 206 determines which camera shake correction amount to use in cutting out an image in accordance with a camera shake and a frame rate at the time of image capture. A frame rate control unit 207 is built in the control unit 118, and changes a frame rate in accordance with image capture parameters and the level of the amount of light in the external environment at the time of image capture.

<Operations of Camera Shake Correction Amount Control Unit>

Figure 3:
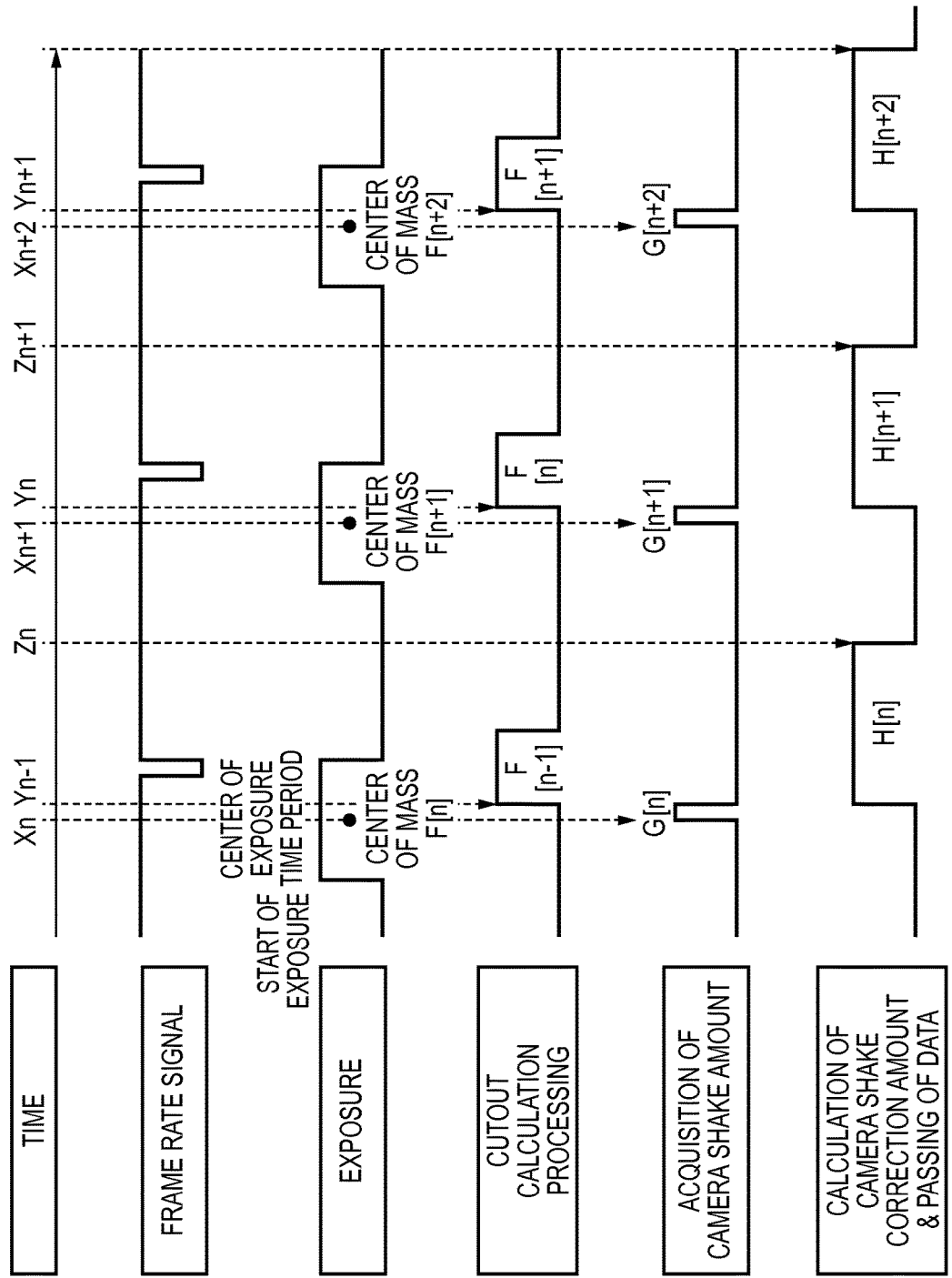
FIG. 3 is a timing chart for camera shake compensation processing according to the present embodiment.

With reference to FIG. 3, the following describes the operations of the camera shake correction amount control unit 109 shown in FIG. 2.

FIG. 3 shows a frame rate signal, an exposure time period signal, an image cutout calculation processing signal, a camera shake amount acquisition signal, and a signal indicating camera shake correction amount calculation processing and a data communication time period. F[n] denotes the $n^{th}$ frame image since the activation, G[n] denotes the $n^{th}$ camera shake amount since the activation, and H[n] denotes the $n^{th}$ camera shake correction amount since the activation.

Time Xn marks the center of an exposure time period of F[n] (center-of-mass timing), and the camera shake amount G[n] is acquired by issuing a system interrupt at this timing. The acquired camera shake amount is processed by the HPF 202, the LPF 203, the estimation calculation unit 205, and the like, and the camera shake correction amount H[n] is output to the captured image signal processing unit 108 at time Zn. Time Yn denotes the timing at which actual cutout processing is applied to F[n] based on the camera shake correction amount H[n], and hence it is necessary to decide on the camera shake correction amount prior to this timing.

However, if the frame rate of moving images increases, or when the camera shake correction amount control unit 109 and the captured image signal processing unit 108 in the image capturing apparatus are composed of different CPUs, it may take a large amount of time to output the camera shake correction amount to the captured image signal processing unit 108, that is to say, the camera shake correction amount may not be passed in time as a result of Zn>Yn. In this case, a camera shake correction amount H[n−1] of the previous time, or an estimated value of a camera shake correction amount, E[n], calculated in advance from a camera shake correction amount up until the previous time (data of or prior to H[n−1]), is used. It should be noted that there may be more than one estimation calculation method.

<Camera Shake Correction Amount Calculation Processing>

Figure 4:
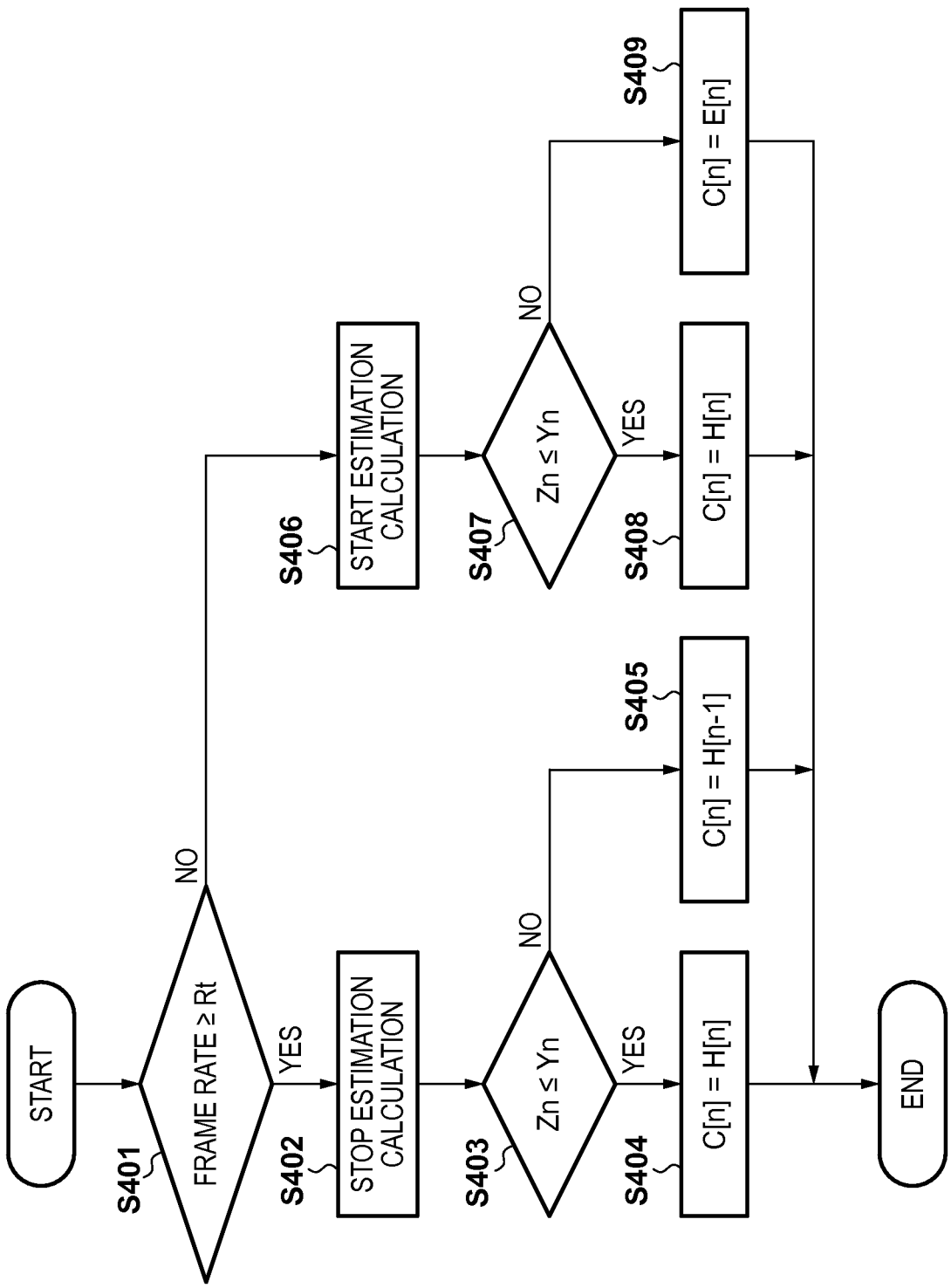
FIG. 4 is a flowchart showing camera shake correction amount calculation processing according to the present embodiment.

With reference to FIG. 4, the following describes camera shake correction amount calculation processing of the camera shake correction amount control unit 109 shown in FIG. 2.

It should be noted that the processing shown in FIG. 4 is realized by the control unit 118 executing a control program stored in a memory on a per-frame rate basis and controlling the camera shake correction amount control unit 109.

In step S401, the control unit 118 determines whether or not the current frame rate is equal to or higher than a frame rate threshold Rt, and if the current frame rate is equal to or higher than the threshold Rt, the estimation calculation of the camera shake correction amount control unit 109 is stopped (step S402). This is because the estimation calculation becomes unnecessary upon setting the threshold Rt of a period that is sufficiently larger than a camera shake frequency band.

In step S403, the control unit 118 determines whether or not the timing Zn at which the camera shake correction amount H[n] is passed to the captured image signal processing unit 108 coincides with or precedes the cutout calculation processing timing Yn. If the result of the determination shows that the passing timing Zn coincides with or precedes the cutout calculation processing timing Yn, the control unit 118 sets H[n] as a camera shake correction amount C[n] that is actually used in the cutout calculation processing (step S404). On the other hand, if the passing timing Zn follows the cutout calculation processing timing Yn, the cutout calculation processing is not executed in time, and therefore the camera shake correction amount H[n−1] of the previous time is set as C[n] (step S405).

On the other hand, if the current frame rate is lower than the frame rate threshold Rt in step S401, the control unit 118 starts the estimation calculation of the camera shake correction amount control unit 109 (step S406).

In step S407, the control unit 118 determines whether or not the timing Zn at which the camera shake correction amount H[n] is passed to the captured image signal processing unit 108 coincides with or precedes the cutout calculation processing timing Yn. If the result of the determination shows that the passing timing Zn coincides with or precedes the cutout calculation processing timing Yn, the control unit 118 sets H[n] as the camera shake correction amount C[n] that is actually used in the cutout calculation processing (step S408). On the other hand, if the passing timing Zn follows the cutout calculation processing timing Yn, the cutout calculation processing is not executed in time, and therefore the estimated value of the camera shake correction amount, E[n], is set as C[n] (step S409).

<Camera Shake Correction Amount Determination Processing>

With reference to FIG. 5, the following describes camera shake correction amount determination processing of the correction amount determination unit 206 shown in FIG. 2.

It should be noted that the processing shown in FIG. 5 is realized by the control unit 118 executing a control program stored in a memory on a per-frame rate basis and controlling the camera shake correction amount control unit 109. In the following description, the correction amount determination unit 206 of the camera shake correction amount control unit 109 serves as a main executor of the operations.

The processing shown in FIG. 5 is for automatically determining whether an image capturing state is constant point image capturing, or image capturing while walking and panning; in the latter case, the frame rate threshold is reduced as high-accuracy camera shake compensation is not required, whereas in the former case, the frame rate threshold is increased as high-accuracy camera shake compensation is required. The frame rates RH, RM, and RL that are set in the following description satisfy the relationship RH>RM>RL.

In step S501, the correction amount determination unit 206 determines whether or not the camera shake amount G[n] is equal to or smaller than a camera shake amount threshold Gt. If the result of the determination shows that the camera shake amount G[n] is equal to or smaller than the threshold (G[n]≤Gt), the correction amount determination unit 206 increments a counter InCnt (step S502).

In step S503, the correction amount determination unit 206 determines whether or not the counter InCnt is equal to or larger than a certain threshold It. If the result of the determination shows that the counter InCnt is equal to or larger than the threshold (InCnt≥It), the correction amount determination unit 206 determines that constant point image capturing, which aims at a certain point, is being performed, and sets the framerate threshold Rt to the largest value RH (step S504). This is because the estimation calculation is required also for a high frame rate. At the same time, the counter InCnt is set to It, and a counter OutCnt is reset to zero. On the other hand, if the counter InCnt is not equal to or larger than the threshold (InCnt≥It) in step S503, the correction amount determination unit 206 maintains the frame rate threshold Rt as-is, that is to say, at a reference value RM (step S505).

On the other hand, if the camera shake amount G[n] is larger than the camera shake amount threshold Gt in step S501, the correction amount determination unit 206 increments the counter OutCnt (step S506).

In step S507, the correction amount determination unit 206 determines whether or not the counter OutCnt is equal to or larger than a certain threshold Ot. If the result of the determination shows that the counter OutCnt is equal to or larger than the threshold (OutCnt≥Ot), the correction amount determination unit 206 determines that constant point image capturing, which aims at a certain point, is not being performed, that is to say, image capturing is being performed while walking and panning, and sets the frame rate threshold Rt to the smallest value RL (step S508). At the same time, the counter OutCnt is set to Ot, and the counter InCnt is reset to zero. On the other hand, if the counter OutCnt is not equal to or larger than the threshold (OutCnt≥Ot) in step S507, the correction amount determination unit 206 maintains the frame rate threshold Rt as-is, that is to say, at the reference value RM (step S505).

Modification Example

A description is now given of processing for changing a frame rate threshold based on a focal length of the image capturing apparatus.

With a smaller focal length, a camera shake causes a smaller change in the angle of view, and the blur on a screen looks smaller; therefore, the smaller the focal length is, the less it is necessary to perform high-accuracy camera shake compensation. For this reason, a frame rate threshold is set in proportion to the focal length as indicated by expression (1).

$$Rt(new) = ZP \times K \times Rt(old) \qquad (1)$$

Here, Rt(new) denotes a frame rate threshold that is newly set in consideration of the focal length, and Rt(old) denotes a frame rate threshold that does not take the focal length into consideration. Also, ZP denotes the focal length, and K denotes a coefficient that takes a positive value.

When the timing Zn for passing the camera shake correction amount H[n] follows the cutout calculation processing timing Yn as in the present embodiment, a calculation processing load associated with prediction of the camera shake correction amount can be reduced by using the camera shake correction amount H[n−1] of the previous time, or the estimated value of the camera shake correction amount, E[n], calculated from a camera shake correction amount up until the previous time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094872, filed May 1, 2014 which is hereby incorporated by reference herein in its entirety.

What is claimed is:

1. An image blur correction apparatus, comprising:
at least one processor or circuit configured to perform operations of following units;
a blur correction amount calculation unit configured to calculate a blur correction amount based on a shake amount of the apparatus;
an estimation calculation unit configured to calculate an estimated value of the blur correction amount using a blur correction amount calculated up until a previous time;
a correction unit configured to correct an image blur by cutting out an image using the blur correction amount or the estimated value; and a determination unit configured to determine an image capturing state in accordance with the shake amount and whether or not to calculate the estimated value in accordance with a frame rate of a moving image, wherein when the frame rate is higher than a threshold, the determination unit determines that the calculation of the estimated value is not performed, and the determination unit includes a setting unit configured to change the threshold in accordance with the image capturing state.

2. The apparatus according to claim 1, wherein the estimation calculation unit calculates an estimated value of a current blur correction amount based on the blur correction amount calculated up until the previous time.

3. The apparatus according to claim 1, wherein when the image capturing state is constant point image capturing, the setting unit sets the threshold to be larger than a reference value so as to facilitate the calculation of the estimated value by the estimation calculation unit.

4. The apparatus according to claim 3, wherein when the image capturing state is not the constant point image capturing, the setting unit sets the threshold to be smaller than the reference value, or does not cause the estimation calculation unit to calculate the estimated value.

5. The apparatus according to claim 3, wherein when the shake amount remains equal to or smaller than a predetermined value for a predetermined time period, the determination unit determines that the constant point image capturing is being performed.

6. The apparatus according to claim 1, wherein the setting unit changes the threshold in accordance with a focal length of the apparatus.

7. An image stabilization method for a shake of an apparatus, the method comprising:

calculating a blur correction amount based on a shake amount of the apparatus;

calculating an estimated value of the blur correction amount using a blur correction amount calculated up until a previous time;

correcting an image blur by cutting out an image using the blur correction amount or the estimated value;

determining an image capturing state in accordance with the shake amount and whether or not to calculate the estimated value in accordance with a frame rate of a moving image; and changing a threshold of the frame rate in accordance with the image capturing state, wherein when the frame rate is higher than the threshold, it is determined that the calculation of the estimated value is not performed.

8. The apparatus according to claim 1, wherein when the determination unit determines that the image capturing state is constant point image capturing, the threshold is reduced by the setting unit.

9. The apparatus according to claim 1, wherein when the determination unit determines that the image capturing state is image capturing while panning, the threshold is increased by the setting unit.

* * * * *